Patented Mar. 10, 1936

2,033,276

UNITED STATES PATENT OFFICE 2,033,276

RUBBER AND RUBBER-LIKE PREPARATIONS

Robert Bertram Fisher Frank Clarke, Cheadle Hulme, and Hugh Mills Bunbury, Prestwich, England, assignors to Imperial Chemical Industries Limited, a corporation of Great Britain No Drawing. Application May 17, 1934, Serial No. 726,126. In Great Britain May 5, 1933

7 Claims. (Cl. 106—23)

The present invention refers broadly to an improved process of working rubber and rubber-like substances, and more particularly relates to a process for producing stable aqueous dispersions of the aforementioned substances as well as the products thereof.

Heretofore considerable difficulty has been experienced in obtaining an intimate admixture of rubber and rubber-like substances with non-analogous compounds. For example, a dispersion of rubber or rubber-like substances in an aqueous medium could be obtained only with considerable difculty and at best was quite unstable.

It is an object of the present invention to devise a process wherein an intimate admixture of rubber and/or rubber-like substances with non-analogous compounds might be obtained. A further object is to produce stable aqueous dispersions of rubber and/or rubber-like substances. A still further object is to increase the efficiency of prior art processes wherein rubber and/or rubber-like substances were worked according to the industrial arts. Additional objects will become apparent from a consideration of the following description.

These objects are attained according to the present invention wherein prior art processes for working rubber and/or rubber-like substances are modified by the addition of a sulfonated derivative of an aliphatic compound of high molecular weight, particularly an aliphatic compound containing at least eight carbon atoms. In its preferred embodiment this invention comprises finely dispersing rubber or rubber-like substances in the presence of water with sulfonated derivatives of higher fatty acids and/or higher fatty alcohols, particularly water soluble sulfate ester salts of the normal primary alcohols containing at least eight carbon atoms.

The invention may be more readily understood by a consideration of the following illustrative examples in which the quantities are given in parts by weight:

Example 1

To 100 parts of the material known as white substitute there was added 10 parts of cetyl-sodium sulfate and 50 parts water. The mixture was treated in a ball mill for several hours until a sample showed a fine state of division, e. g. such that the majority of the particles were of the size 0.3–1.3 $\mu$. The product was a white paste completely compatible with rubber latex to form a stable emulsion.

Very satisfactory results were obtained by substituting a mixture of lauryl- and myristyl-sodium sulfate for the cetyl-sodium sulfate used in the above example.

Example 2

25 parts of the rubber substitute prepared according to British Patent No. 343,099, Example 2, were masticated in an internal mixer of the Baker-Perkins type for 4 hours in the cold. 16.5 parts of a 15% aqueous paste of cetyl-sodium sulfate ester were fractionally added over about half an hour. The mixing was continued for a further half an hour. The whole operation was carried out cold, e. g. below about 30° C. A highly dispersed paste (average particle size 0.3–1.3 $\mu$) of 60% strength of the substitute was thus obtained, which was incorporated into latex to give a stable emulsion.

A mixture of cetyl-, oleyl- and stearyl-sodium sulfate was used in place of the cetyl-sodium sulfate referred to. The product produced an emulsion of exceptional stability.

Example 3

1000 parts of white reclaim rubber was masticated in an internal mixer for 4 hours. 100 parts of a 15% aqueous paste of cetyl-sodium sulfate and 100 parts of water were gradually added. Mixing was continued for a further half hour. The whole operation was carried out in the cold. Heating was generally to be avoided. A stable concentrated emulsion of the rubber was thus obtained.

It is to be understood that the aforementioned examples are illustrative merely of the present invention, and may be subjected to considerable variation and modification without departing from the scope of this invention. For instance, in place of the sodium salt of cetyl sulfate other salts as well as sulfate esters of different higher fatty alcohols may be used. These alcohols may be either saturated or unsaturated and may be further substituted. A few of the alcohols which fall within this category are lauryl, myristyl, cetyl, stearyl, oleyl and ricinoleyl alcohols. Likewise, sulfonated derivatives of the higher fatty acids corresponding to these alcohols may be used in place thereof or in addition thereto. The preferred compounds are to be understood as derived from normal primary alcohols which contain from twelve to eighteen carbon atoms and may be saturated or unsaturated.

Very satisfactory results may often be obtained by mixing two or more of the sulfonated agents described herein prior to working of the rubber or rubber-like substances. In this manner the superior wetting out poperties of one compound may be utilized and enhanced by the presence of another compound which is more soluble. Sulfonated derivatives of the unsaturated alcohols and acids have in general a higher solubility than the corresponding saturated compounds, consequently they may advantageously be substituted for or used in conjunction with sulfonated derivatives of saturated compounds. Such a mixture of wetting agents may be obtained by mixing the individual components or by sulfonating a mixture of alcohols. Mixtures of these alcohols may readily be obtained by saponifying sperm oil and separating the alcohols therefrom, the resulting mixture comprising chiefly cetyl, stearyl and oleyl alcohols. Likewise, a desirable mixture of such alcohols may be obtained by the sodium reduction or catalytic hydrogenation of coconut or palm kernel oil. The alcohols obtained from coconut and palm kernel oil contain varying proportions of alcohols having from eight to eighteen carbon atoms in the molecule. The lower members of the series may be eliminated by fractional distillation, or in some cases be sulfonated and used in conjunction with the higher members. As is well known, there are many natural substances from which alcohols or mixtures thereof may be obtained and these are intended to be included within the scope of the present invention. Typical examples of such natural substances are beeswax, wool fat, montan wax, carnauba wax, etc.

Sulfonation of the aliphatic compounds comprised herein is understood to be a generic expression comprising the substitution on the aliphatic compound of sulfate and/or true sulfonate radicals. Wherever in the present specification or claims reference is made to "sulfonation" it is therefore understood that this is used in the aforementioned generic sense. Sulfonation of these compounds may advantageously be accomplished by treating said compounds with concentrated sulfuric acid, chlorsulfonic acid or sulfur trioxide. This reaction may be carried out in the presence of agents having an avidity for water, for instance acetic anhydride, phthalic anhydride, sulfur trioxide and anhydrous acids both organic and inorganic. In general, the sulfonation treatment is carried out at relatively low temperatures, namely temperatures within the range of 0° C. to about 30° C. This temperature range is not mutually exclusive but is ordinarily preferable. Considerably higher temperatures may be utilized in some cases temperatures above 100° C. producing a satisfactory product.

Prior to sulfonation of the aliphatic compounds comprised herein it is possible and sometimes even desirable to treat said compounds with other acidic reagents, as, for example, acetic, boric or phosphoric acids. Where the aliphatic compound is unsaturated this pre-treatment is particularly efficacious. Upon the sulfonation of such pre-treated compounds products are obtained which probably contain both the radical of the acid with which the compound was pre-treated and the sulfonated radical. These products have good wetting and emulsifying properties and are of value in this connection either alone or in admixture with the herein described sulfonated derivatives which have not been subjected to such pre-treatment.

For optimum results water soluble salts of the aforementioned sulfonated esters are utilized, and in particular the alkali metal including the ammonium salts. It is to be understood that the free acids as well as numerous other salts are contemplated for this purpose, including organic salts such as those produced by reaction of the sulfonated esters with organic bases such as pyridine and triethanolamine. In its practical application this invention comprises not only the use of a mixture of sulfonated compounds but also a mixture of salts of such compounds.

The foregoing description lays particular emphasis upon the sulfonated normal primary alcohols. However, this was merely for purposes of illustration and is not to be construed as a limitation upon the breadth of the present invention. In place of such sulfonated alcohols the corresponding acids may be used. Furthermore, esters or ethers containing aliphatic radicals having eight or more carbon atoms may likewise be used in place of or in conjunction with one or more of the compounds described supra, although such compounds are ordinarily of secondary importance only. Compounds falling within this category are beta-sulfo-ethyl-oleate and cetyl-sulfo-ethyl ether.

The rubber or rubber-like substances contemplated herein include and may be illustrated by caoutchouc, jelutong, guayule, balata, factis and the numerous polymerized products having rubber-like properties. These compounds may be treated alone or in admixture with one another. Where an aqueous dispersion of such substances is desired it is frequently advisable to masticate the substances prior to addition of the wetting agent or agents. This pre-treatment depends in great part upon the particular compound to be worked and should occasion no difficulty to one skilled in the art. The dispersing agent or agents may be mixed with water before addition to the rubber or rubber-like substances or may be added thereto in a dry form or dissolved or suspended in an organic medium. In addition, it may be stated that while the treatment described in most detail herein comprises the presence of water this may be partially or entirely dispensed with by the addition of other well known treating agents. It is to be understood that during the practice of this invention well known compounds may be added to the rubber or rubber-like substances where the incorporation of such compounds was found advantageous in the past.

As many apparently widely different embodiments of this invention may be made without departing from the spirit and scope thereof, it is to be understood that the invention is not limited to the specific embodiments thereof except as defined in the appended claims.

We claim:
1. A process for producing aqueous dispersions of rubber and rubber-like substances which comprises milling said substances with a water soluble salt of a sulfate ester of a normal primary alcohol containing at least eight carbon atoms, in the presence of water.
2. A process for producing aqueous dispersions of rubber and rubber-like substances which comprises milling said substances with an alkali metal salt of a sulfate ester of a normal primary alcohol containing from twelve to eighteen carbon atoms, in the presence of water.
3. A process for producing aqueous dispersions of rubber and rubber-like substances which comprises milling said substances with an alkali metal salt of a sulfate ester of a normal primary alcohol selected from the group consisting of lauryl, myristyl, cetyl, stearyl and oleyl alcohols, in the presence of water.

4. An aqueous dispersion of rubber and rubber-like substances which comprises said substances in an aqueous medium in the presence of a water soluble salt of a sulfate ester of a normal primary alcohol containing at least eight carbon atoms in the molecule.

5. An aqueous dispersion of rubber and rubber-like substances which comprises said substances in an aqueous medium in the presence of an alkali metal salt of a sulfate ester of a normal primary alcohol containing from twelve to eighteen carbon atoms in the molecule.

6. An aqueous dispersion of rubber and rubber-like substances which comprises said substances in an aqueous medium in the presence of an alkali metal salt of a sulfate ester of a normal primary alcohol selected from the group consisting of lauryl, myristyl, cetyl, stearyl and oleyl alcohol.

7. A process for producing stable aqueous dispersions of rubber and rubber-like substances which comprises milling reclaimed rubber with an aqueous solution of cetyl sodium sulfate.

ROBERT BERTRAM FISHER.
FRANK CLARKE.
HUGH MILLS BUNBURY.